US005590282A

United States Patent [19]

Clynes

[11] Patent Number: 5,590,282

[45] Date of Patent: Dec. 31, 1996

[54] REMOTE ACCESS SERVER USING FILES CONTAINING GENERIC AND SPECIFIC MUSIC DATA FOR GENERATING CUSTOMIZED MUSIC ON DEMAND

[76] Inventor: Manfred Clynes, 19181 Mesquite Ct., Sonoma, Calif. 95476

[21] Appl. No.: 272,849

[22] Filed: Jul. 11, 1994

[51] Int. Cl.$^6$ .............................. G06F 13/00; G10F 1/00

[52] U.S. Cl. .............................. 395/200.02; 395/200.18; 84/600

[58] Field of Search .............................. 395/2.12; 364/410; 360/13, 15, 69; 172/2; 84/603, 612, 462, 706; 379/90, 67; 348/14

[56] References Cited

U.S. PATENT DOCUMENTS

| | | | |
|---|---|---|---|
| 4,329,902 | 5/1982 | Love | 84/706 |
| 4,500,933 | 2/1985 | Chan | 360/69 |
| 4,581,484 | 4/1986 | Bendig | 379/67 |
| 5,146,833 | 9/1992 | Lui | 84/462 |
| 5,270,475 | 12/1993 | Weiss et al. | 84/603 |
| 5,283,638 | 2/1994 | Engberg et al. | 348/14 |
| 5,283,819 | 2/1994 | Glick et al. | 379/90 |
| 5,355,302 | 10/1994 | Martin et al. | 364/410 |
| 5,365,381 | 11/1994 | Scheffler | 360/15 |
| 5,388,181 | 2/1995 | Anderson et al. | 395/212 |
| 5,418,654 | 5/1995 | Scheffler | 360/13 |
| 5,488,196 | 1/1996 | Zimmerman et al. | 84/612 |

*Primary Examiner*—Thomas C. Lee
*Assistant Examiner*—Duo Chen
*Attorney, Agent, or Firm*—Michael Ebert

[57] ABSTRACT

An information highway for music performance and interpretation in which a plurality of subscribers are linked by an interactive network to a central computer station. In the memory of the station is stored a library of music scores, each being defined by the nominal notation of a particular composition, the memory also storing microscores which render the music scores expressive and meaningful. Many different microscores may be stored for each score. The memory may also have stored therein global microstructure information. Music resulting from the combination of a music score and a microscore may be reproduced either at the central computer and then transmitted to the subscriber, or may be reproduced at the subscriber's post. The subscriber chooses the music score to be reproduced and also selects or creates the microscore to be imparted to the respective notes of the music score so as to render the performance of the composition expressive. The subscriber may also compose his own music, type it in and have it performed with his own global choice of microstructure.

13 Claims, 1 Drawing Sheet

REMOTE ACCESS SERVER USING FILES CONTAINING GENERIC AND SPECIFIC MUSIC DATA FOR GENERATING CUSTOMIZED MUSIC ON DEMAND

BACKGROUND OF INVENTION

1. Field of Invention

This invention relates to a music information highway in which a plurality of subscribers are linked by a network to a central computer station in whose memory is stored a library of music scores, each defined by the nominal notation of a particular composition.

2. Status of Prior Art

My prior U.S. Pat. Nos. 4,763,257 and 4,707,682 disclose a computerized system into which is fed the nominal values of a musical score, the system acting to process these values with respect to the relative loudness of different tones in a succession thereof, changes in the duration of the tones and other deviations from the nominal values which together constitute the microstructure or microscore of the music notated by the score. The system yields the specified tones of the score as modified by the microscore, thereby imparting expressivity to the music that is lacking in the absence of the microscore.

Music has been defined as the art of incorporating intelligible combinations of tones into a composition having structure and continuity. A melody is constituted by a rhythmic succession of single tones organized as an aesthetic whole. The standard system of notation employs characters to indicate tone. The duration of a tone (whole, half, quarter, etc.) is represented by the shape of the character, and the pitch of each tone by the position of the character on a staff.

While the notation of a musical score gives the nominal values of the tones, in order for a performer to breathe expressive life into the composition, he must read into the score many nuances that are altogether lacking in standard notation. Some expressive subtleties are introduced qualitatively as a matter of accepted convention, but virtually all departures from the nominal values appearing in the score depend on the interpretive power of the performer.

Thus, a musical score, may indicate whether a section of the score is to be played loudly (forte) or softly (piano) without however indicating a quantitative relation between forte and piano. And the score does not generally specify the relative loudness of component tones either of a melody or of a chord with anything approaching the degree of discrimination required by the performer. The performer therefore must decide for himself how loudly specific notes are to be played to render the music expressive.

Equally important to an effective performance of most music is the amplitude contour of each tone in the succession thereof. To satisfy musical requirements, the amplitude envelopes of the tones must be individually shaped. Though, in general, amplitude contours are completely unspecified in standard notation, each performer, such as a singer or violinist who has the freedom to shape tones, does so in actual performance to impart expressivity thereto. Indeed, with those instruments that lend themselves to tone shaping, variations in the amplitude shapes of the tones constitute a principal means of expression in the hands of an expert performer.

Another factor which comes into play in the microstructure of music are subtle deviations from the temporal values prescribed in the score. Thus, in actual performance, to avoid temporal rigidity which dehumanizes music, and to impart meaningful expression thereto, the performer will in actual practice amend the nominal duration values indicated by standard notation. They should not be amended in a random way as is often the case in synthetic music, but in a manner imparting meaning and feeling to the music.

Yet another expressive component of music which is unspecified in the score is the timbre to be imparted to each tone; that is, the harmonic content thereof. A performer of a string instrument, by varying the pressure and velocity of the bow on the string, can give rise, not only to variations in the loudness of the tone, but also variations in its tonal timbre both from one note to another and within each tone, independently of loudness. Still another expressive component is the vibrato imparted to each tone which also varies in nature from tone to tone.

In short, the "macrostructure" of a musical composition is defined in the score by standard notation. If, therefore, one executes this score by being assiduously faithful only to the notes as given in the score, the resultant performance, however expertly executed, will be bereft of vitality and expression. The term "microscore" as used herein encompasses all subtle deviations from the nominal values of the score in terms of amplitude size and shaping, timing, timbre, vibrato and all other factors which endow music with feeling and expressiveness.

Essential to an understanding of a microscore in the context of a system in accordance with the invention are A. the inner pulse of composers and B. predictive amplitude shaping. These will now be separately considered.

In the computerized system disclosed in my prior patents, fed therein are the nominal values of a musical score, the system acting to process these values with respect to the amplitude contour of individual tones, the relative loudness of different tones in a succession thereof, changes in the duration of the tones, vibrato, timbre and other deviations from the nominal values which together constitute the microscore of the music notated by the music score. The system produces the specified tones in the score as shaped and modified by the microscore, thereby imparting expressivity to the music that is lacking in the absence of the microscore. The microscore may also include changes in pitch.

In order to produce convenient shapes for creating amplitude envelopes of individual tones, we have used a mathematical means, briefly called the Beta Function. This term derives from a similarly-named function in mathematical statistics. The Beta Function permits us to create a wide variety of shapes with the aid of only two parameters ($P_1$ and $P_2$).

In electronic generation of musical sounds, it has heretofore been conventional to specify tones using parameters of rise time, decay time, sustain time, release time and final decay, or some subset or multiple set of these. These parameters, familiar to the electronic engineer, modeled on a piano key action, do not really have an appropriate musical function in representative musical thought. Amplitude shapes of musical tones often need to be convex rather than concave (or vice versa) in particular portions of their course (e.g., convex in their termination), and hardly ever have sustained plateaux. Moreover, separation of the termination of a tone into a decay and a release is generally the result of the mechanical properties of keyboard instruments and not a musical requirement.

We have found that the varied rounded forms available through the Beta Function allow a more faithful, simple and time-economical realization of the multitude of nuances of musical tone amplitude forms.

A computerized system as disclosed in my prior patents acts to impart an emotionally-expressive microstructure or microscore to the respective notes in the score of a musical composition constituted by a succession of notes whose notation provides the nominal value for each note in regard to its pitch and duration. The system comprises a digital calculator and means to enter therein nominal data representing the nominal pitch and duration of each of the successive notes in the musical score to be processed. Also included is a matrix having stored therein microscore data relating to the relative loudness and duration values of a series of notes forming a group (say 4 sixteenth notes) representing the inner pulse of a given musical composer, aspects of the ethnic character of the music, or merely aspects of that piece of music, that is a specific combined time and amplitude warp; and means to enter into the calculator this microscore data.

The matrix can operate simultaneously on several levels of the structure, forming an array of elements each of which has a different loudness and amplitude. A 4×4×4 array for example has 64 such elements. Attenuation factors are provided to regulate the degree to which the amplitude and time warps are effective on each hierarchic level.

The calculator acts to process the nominal data entered therein with reference to the microscore data also entered therein to yield in its output with respect to each note in the succession thereof a series of digital values representing loudness and duration changes in accordance with their interrelationship to the inner pulse of the composer, and also to contour the amplitude of each note in accordance with its relationship to the succeeding note, called predictive amplitude shaping. Also included are means responsive to this output to generate and audibly reproduce tones representing the notes of the musical score as modulated by the microscore data to render the reproduced music derived from the score expressive.

The system disclosed in my prior patents includes a keyboard or other means making it possible for the user to enter the successive tones of a given musical score in terms of their nominal pitch and duration expressed in alphanumeric terms.

The present invention takes into account that there is a vast literature of musical compositions whose printed scores are available. Even in the classical field, this literature encompasses many thousands of scores. While one could provide a computer system of the type disclosed in my prior patents with a CD ROM or other forms of memory in which hundreds of scores are stored, operating in conjunction with means to feed into the system any one of the selected scores so that it can be expressively reproduced, this arrangement may involves capital expenses of a relatively expensive system of this type, as well as reduced convenience.

SUMMARY OF INVENTION

The main object of this invention is to provide an information highway for music performance and interpretation which greatly expands the usefulness of a computerized system of the type disclosed in my prior patents to impart expressivity to the reproduced notation of a music score, and thereby make it possible for many thousands of users of the highway to have access to and to themselves interpret virtually the entire published literature of music.

Also an object of this invention is to provide a music information highway of the above type which may be erected at relatively low cost and which operates efficiently to service the subscribers thereto who make use of the highway.

These objects are attained by a music information highway in which a plurality of subscribers are linked by an interactive network to a central computer station or server in whose memory is stored a library of music scores, each being defined by the nominal notation of a particular composition, the memory also storing microscores the purpose of which is to render the music scores meaningful and expressive. Many different microscores may be stored for each score.

Music resulting from the combination of a music score and a microscore may be reproduced either at the central computer in digital or analog form and then transmitted to the subscriber, or may be reproduced at the subscriber's post. The subscriber chooses the music score to be reproduced and also selects, modifies or creates the microscore to be imparted to the respective notes of the music score so as to render the performance of the composition meaningful and expressive in a way dictated by the subscriber.

BRIEF DESCRIPTION OF DRAWING

For a better understanding of the invention, reference is made to the detailed description to be read in conjunction with the drawing whose single figure is a block diagram of a music information highway in accordance with the invention.

DESCRIPTION OF INVENTION

Figure 1:
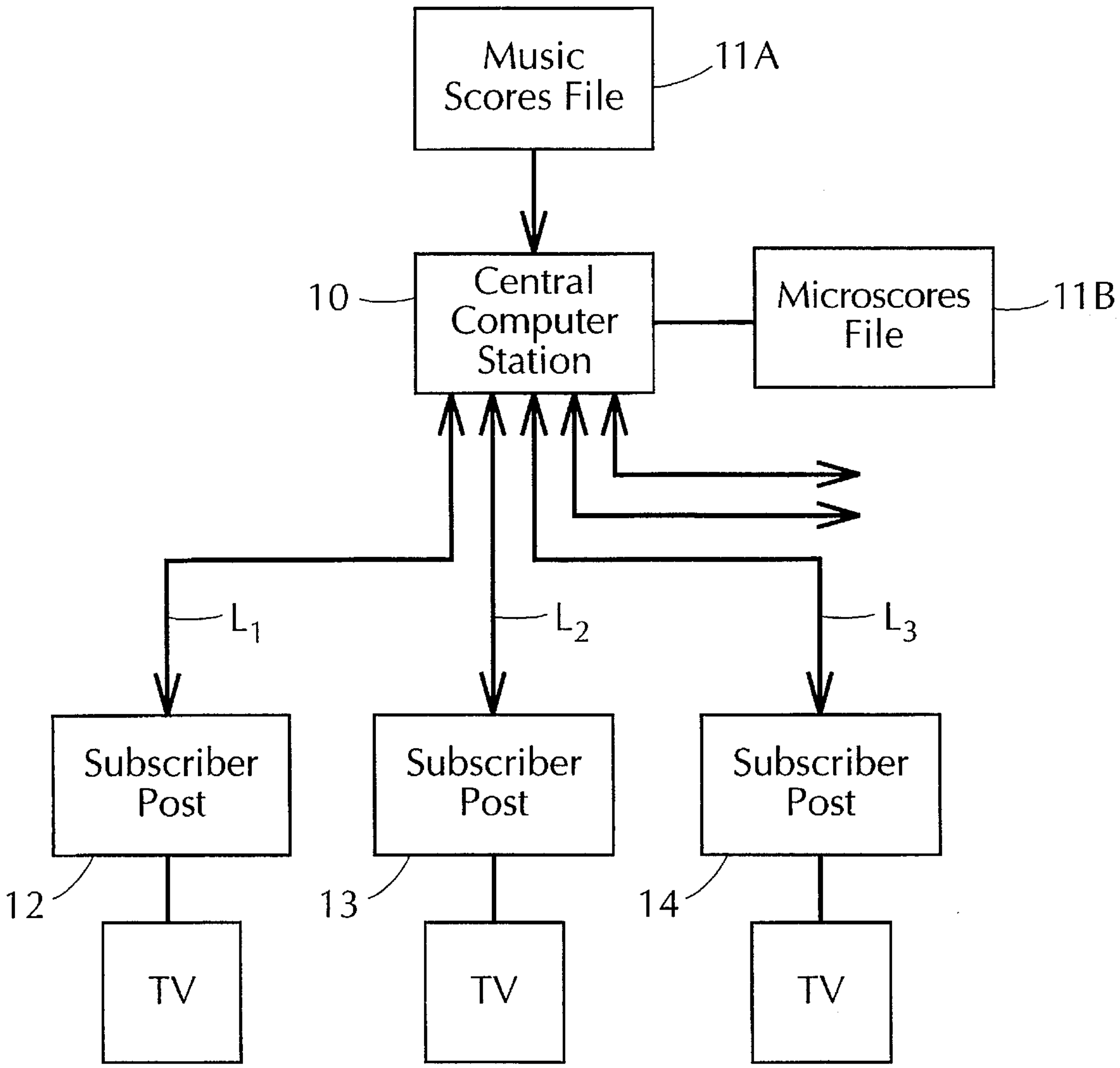

A music information highway in accordance with the invention, as shown in the figure, includes a central computer station 10 in whose memory file 11A is stored a library of music scores, each defined by the nominal notation of a particular composition, and in whose memory file lib as stored a bank of microscores adapted to render the music scores expressive.

As pointed out previously, the standard system of notation indicates the pitch of each tone and its duration. Actual visual scores including all the expressive markings printed thereon may also be stored in the central computer and presented as images on a TV screen and printed out at a subscriber's post for his general guidance.

Linked to central computer station 10 by an interactive network represented by lines $L_1$, $L_2$ and $L_3$ are a plurality of local subscriber posts 12, 13 and 14, each provided with a TV display terminal. While only three subscriber posts are shown, in practice, there may be numbered in the hundreds or many thousands. The network may be comprised of cable channels as in interactive cable TV systems.

Central computer station 10 is capable of reproducing any music score selected from its file 11A (in practice, the file may contain thousands of music scores covering the entire classical repertory or other music) and of conveying the score selected for reproduction to the subscriber. The matrix and other means disclosed in my prior patents for imparting a microstructure to the score to be reproduced can be included in the central computer station 10, but can also be stored at each subscriber's post. Each subscriber interactively can create his own microscore for any selected music score. Thus the microscores for particular music scores may be stored centrally in microscore file 11B or at the subscriber posts. The program to derive music from the music score as modified by the microscore may be stored centrally or at each post. If stored centrally, the actual reproduced music may be transmitted digitally or in analog form to a subscriber post. Or the music score and the related microscore may be transmitted from the central computer to a subscriber post and there converted to music. Each subscriber therefore in effect becomes an interpreter of the music score he has selected.

In practice, to obtain access to the central computer station and to select a score to be reproduced, the subscriber pays a fee to do so. Billing may be carried out in the manner now used in conjunction with pay cable TV. The subscriber not only transmits over the network to the central station, his choice of the score to be reproduced, but also transmits the microscore parameters to be used by the computer in reproducing the selected score.

The microscore is preferably created by a subscriber by chosing parameters from the screen of the TV terminal associated with the subscriber's post; by using user interface of the computer or a special purpose box. This will allow the user to do the following:

1. select a piece from a list (in flat score, i.e., just the nominal notes and durations);
2. select pulse configuration (e.g., 4, 3, 4-3 levels);
3. select a composer's pulse matrix; change any of the values therein;
4. select pulse attenuation factors for each level;
5. select reset points for the pulse, to accommodate odd sequence of bars, if necessary (pulse applies to all voices);
6. select tempo;
7. choose Beta function values of $P_1$ and $P_2$ to select basic shapes for the notes; do this for each voice; also select the skewing constant for each voice; (Predictive Amplitude Shaping);
8. select dynamics of each voice or all the voices, for given ranges of bars; crescendos, diminuendos (by formula), terrasse levels, and pitch crescendo (pitch crescendo is an increase in loudness as the pitch goes higher in a particular voice);
9. select ritards or accelerandos over particular ranges of bars; these can be terrassed ritards (i.e., uniform) or gradually developing, by formula;
10. single notes can be changed in loudness, duration, and shape ($P_1$ and $P_2$), legato and staccato if required; the latter can also be changed in groups of notes;
11. the score (as defined above) can be viewed, displaying the microscore;
12. vibrato can be selected in various forms, for various voices, for various ranges; values for vibrato beginnings and ends can be selected for notes as a global choice, as a mean value, indicating at what proportion of the note the vibrato begins and ends. These values are then changed by the program note by note according to its inherent algorithm, which also takes into account what the next note will be and when. Vibrato base frequencies and vibrato base amplitudes can be selected for each voice; and
13. Switch the instruments that play; omit some, and add some.

The user can change the parameters from the screen of the TV terminal, or from a special purpose box at his local post to change the microscore, and have the piece or portions of it played with the altered parameters. He then can change them again, and each time listen to the new version. In this way he can perfect an interpretation. The playings will be done from the central computer station 10 or locally, and the microscore too may be there stored or this can be done locally with software. Existing microscores will be kept in memory file B at the central station 10 (or at the user's home post in his own memory device) and he can play the music at any time.

It is important to note that the sounds of the musical composition are not stored, only the music score and the microscore. Typically a savings of 500 times less memory space is achieved by this arrangement. A typical piece in music score and microscore might be just 300 kbytes long, while the same piece stored as 44,100 sound samples per second will occupy 150 megabytes.

A similar process could be carried out at a person's own microcomputer, if it is powerful enough, and many scores stored on a CD ROM. But the advantage of having the multitude of music score stored at a central computer station, and making each piece available on demand for a fee is enormous. 2–3 gigabytes of memory will suffice to store more than all known western classical music as scores at a central location. 10 gigabytes would additionally accommodate individual interpretations from users for a limited time, and the ones the user wishes to keep might be stored at home on digital disk or tape. Hence a central location with less than 20 gigabytes of memory could accommodate all of the classical music needs of the world to permit anyone, anywhere at any time to make their own interpretation of any piece in the classical music literature. A similar situation holds for non-classical music such as pop in which, as a rule, the music pieces are much shorter.

The sound would be sent to a subscriber from the central computer station, and the subscriber would send microscore data to the central computer station, using fiber optic networks or interactive video cable channels for this purpose. As in interactive video, the selection process by the user will include the opening of windows or icons within windows, each window or icon allowing a number of selections.

If a microscore stored at a subscriber's post is to be played, it can be transmitted to the central station first (say less than 30 kbytes), if this can easily be done. Alternatively, all microscores created by the user will be kept at the central station. This would be an elegant solution, but would require enough central memory to store millions of microscores. In view of the great memory requirements of storing video images which exceed microscore requirements by more than four orders of magnitude per unit time, this may not be too onerous.

It means that ten thousand microscores of individual users could be stored for each correspondingly-long video program. If more than 10,000 users wish to store their individual interpretations of a particular piece as microscore on the average at the same time, the usage of space would start to exceed the need for storage of a single video presentation by comparison. E.g., if 10,000 interpretations of the Beethoven Appassionata Sonata would coexist simultaneously at the central station. That is why probably one might put a time limit on how long they will be stored at the central station. For longer storage than a month say, they should be downloaded at the person's home. But some usage plan while the subscriber is still working on the piece should be quite feasable. Thus, they could be kept on digital tape at the central station. Compression techniques would further reduce this problem.

The program to convert the music score and its microscore into sound will be sent to the post from the central station each time it is to be used, or stored only centrally, or stored at the post, depending on economic considerations A great advantage of the central system is that the very best and longest sound samples of many instruments can be used centrally to shape the tones of the music, regardless of their memory requirements. Thus, single samples of even 500 kb can be used without looping and many samples used, requiring memory space in the computer that plays, hundred of megabytes of RAM. But that is a small matter for large central computers. In that way all violin sounds can be stradivarius-produced sounds, etc., and many samples can be stored for each instrument. The same samples are used for all music using that instrument.

Furthermore, the system will easily allow even the largest symphonies and choral works to be faithfully interpreted by this means, with each musical instrument individually controlled and shaped. This is because a central computer can be very powerful compared to individual home computers where 12 voices may present a problem to the fastest currently available PCs. The transmitted sound of a symphony or of two voices has the same number of 44,100 samples per second for each of two stereo channels.

Moreover, the interpretations generally will have perfect ensemble, a unified interpretation, continuity of feeling, and a virtuosity unequalled by human performers.

Alternatively, some performances can be transferred onto digital tape as sound files at the central location, and then directly played at will from the central station, either from tape or from the computer without requiring the computer, at the time of playing, to convert the microscore into sound. But this should not normally be required.

In practice, instead of a single central station, one may provide a number of such stations strategically distributed throughout the country. In this way the load imposed on each central station would be dicreased and the distances for transmission reduced.

Furthermore, it should not be a problem to extend this technology to 20 bits from the 16 bits that is currently available, thereby further improving the sound dynamic range and quality, especially in the softer parts.

DACs would be located at the home receiver and would connect directly to the user's HI-FI system as AUX input. Or digital technology would permit the digital signal to be converted into sound by the HI-FI system itself. The subscriber would pay only for the pieces he uses and the interpretations he makes and stores. Thus he would have available at his local post at any time all the great music, one piece at a time. Moreover, a subscriber can interchange interpretations with other subscribers.

A further capability of a music highway in accordance with the invention is that it allows any subscriber to enter notes by means of a standard keyboard or a music keyboard for those who can play it and thereby become a composer. These entered notes then become a music score, as previously defined, and therefore can be performed by creating a microscore as if it were composed by a listed composer. The subscriber can create his own personal pulse matrix with this method and use predictive amplitude shaping and organic vibrato, and can have his own composition performed in any way he wishes it to be played by any instrument, even though he may be able to play it himself at all. This ability is handled through the central station, as above. The composer of such music is not limited in regard to the type or style of music he in any wish to compose, for he has available the best instrumental sounds for his music.

Modes of Producing Sounds

Two basic modes exist to convert the microscore and score into sounds; both modes being the state of the art.

Mode I. (Sample Sound Method)

In this method the sounds of each instrument are collected as samples. The samples are stored, typically 15 to 20 samples for most orchestral instruments. They are of particular notes within the range of the instrument. Other notes are obtained from these by transposition. The smaller the steps between samples, the less need is there for transposition. Preferentially, one would want to have samples of all semitones notes within the range of the instrument. Further it can be desirable to have several samples of each note at different loudness levels. In that way it is possible to readily produce the different spectral characteristics that the instrument produces at different loudness levels.

One can switch from one loudness level sample to another, with an interpolation or mixing method, depending on the loudness required at that note. Moreover, certain special effects like pizzicato can be sampled separately. Thus a considerable array of samples is the ideal condition. Against this normally weighs the limitation of memory. This limitation would not be the case however in a central station.

Samples are obtained with microphones in a studio setting, a player playing only single notes, without expression, one at a time. The length of the notes is of the order of 2–10 seconds.

It is the practice today that in order to get away with shorter samples, of a fraction of a second, one uses "looping." With a looping technique, a short segment of a sample is repeated endlessly, making it in effect as long as one wishes. This technique results in the seams being audible to a varying degree, and is an imperfect makeshift. Looping is also difficult in that the phase and slope of the wave has to be matched at the joints, otherwise clicks appear. The central station makes all this looping unnecessary.

Mode II. (Mathematical Models)

A more recently developed method is to make a mathematical model of the physical characteristics of the instrument, and use such a mathematical model on a computer to produce the resonances and transient response characteristics of the instrument concerned, under various conditions. Such physical models have the advantage of requiring less memory space, and are able in theory to provide a wide range of sound characteristics. These models, one for each instrument, may replace the samples of the above Mode I., and can be used either centrally or locally with our score and microscore combination. Either method would be suitable for the invention. Preference will be given depending on the state of the art of such mathematical models as are being developed at the Media Lab, MIT, Stanford CRRMA, University of California Berkeley, Center for New Music and Audio Technologies (CNMAT), Carnegie Mellon, and elsewhere.

In either case it is a question of producing the waveform as a carrier that represents the sonority of that instrument. The shaping of that sound however to create music is accomplished by our technology of producing a meaningful microstructure.

In practice, therefore, there are three parts to our process: Part 1, the score, Part 2, the microscore and Part 3, the conversion of the microscore+score to actual sound. The latter, for sampling techniques is well accomplished by the Csound capacity developed at MIT by Barry Verco which is generally available. Csound can take a score written in a format that it accepts and perform it.

The format of our microscore has been adapted so that it converts to the format usable by Csound, and the two processes function together as our interpretation performance program, used in the present invention. Our special adaptation of Csound deviates in a number of ways from the original Csound; it has been modified so that it can be used for varying interpretations and repeated playings, and for playing as the results are calculated, i.e., in real time, without the need to have a soundfile made first, i.e., a file of the 44,100 audio-samples per second.

A special advantage of the sampling technique in conjunction with the inventive process is that a person using a microphone at home can record his own voice as a series of samples, singing say single notes of a simple scale or even part of a scale totally without expression. From these raw samples, the user can then be made to sing expressively any aria or even four-part harmony, chorales, etc. with their own voice as a foundation.

While there has been disclosed a preferred embodiment of the invention, it will be appreciated that many changes may be made therein without departing from the spirit of the invention.

I claim:

1. A music information highway comprising:

A. a central computer station having a first memory file in which is stored a library of different music scores, each score being defined by the nominal notation of a particular music composition including the pitch and duration of each tone, the station including a stored source of sounds and means coupled to the source to play and reproduce the tones of a score selected from the first file;

B. a second memory file which is a matrix having stored therein microstructures related to the relative loudness and duration values of a series of notes, said stored different microstructures each adapted to modify the nominal notation of a selected score including the duration and amplitude of a selected score including the duration and amplitude of the notes to impart expressivity to the reproduced score; and C. a plurality of subscriber posts coupled by an interactive network to said station, each post having means to select from the first file for reproduction by the station a particular means to select from the first file for reproduction by the station a particular score and to select from the second file a microscore modifying the nominal notation of the selected score so that the selected music composition, played expressively, can be heard at the post.

2. A highway as set forth in claim 1, in which each post includes a TV terminal on which the microscore is exhibited.

3. A highway as set forth in claim 1, in which the pulse matrix operates on two, three or four hierarchic levels.

4. A highway as set forth in claim 3, having adjustable attenuation factors for each level.

5. A highway as set forth in claim 1, in which the shape of a note in the series is formed as a function of its relationship to the next note.

6. A highway as set forth in claim 1, in which the network is formed by video cable channels.

7. A highway as set forth in claim 1, in which said source of sounds stored in the computer are digital samples of the tones of different instruments, from which samples are derived and shaped the sounds to be reproduced.

8. A highway as set forth in claim 1, in which the sounds in the sound source are derived from samples of actual instruments.

9. A highway as set forth in claim 1, in which the sounds in the sound source are derived from samples of a subscriber's voice.

10. A highway as set forth in claim 1, including means to impart vibrato to the sounds produced by the sound source.

11. A highway as set forth in claim 1, in which the sounds in the sound source are derived from mathematical models of instruments.

12. A highway as set forth in claim 1, in which included in the library is the nominal notation of a music score composed by a subscriber whose notation is entered by the subscriber operating a standard or a music keyboard.

13. A highway as set forth in claim 1, including means to select a score from the first memory file and to print out the selected score at a subscriber's post.

* * * * *